J. A. DAVIS, W. D. GUSEMAN & H. D. McGEORGE.
Harrow.
No. 203,248. Patented May 7, 1878.
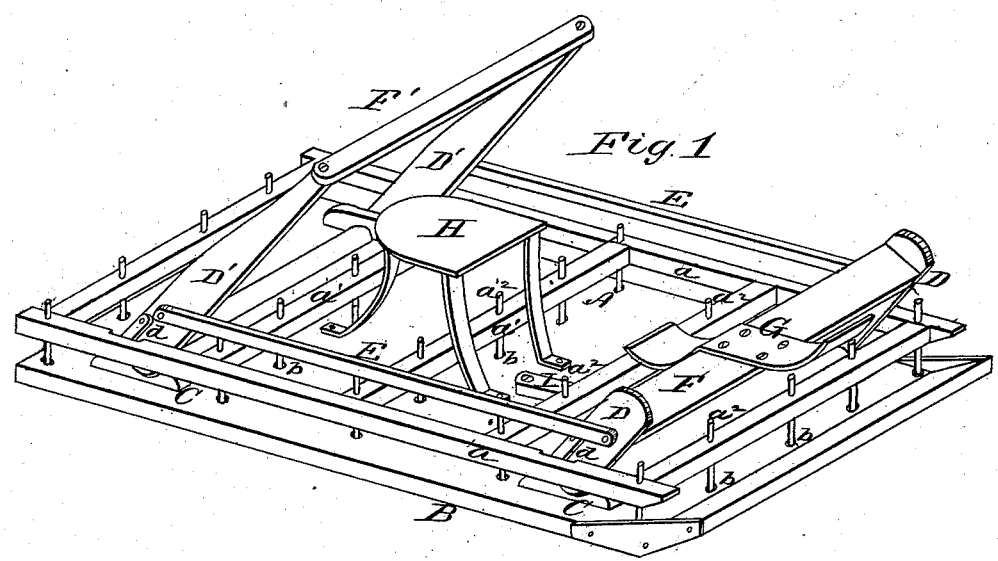
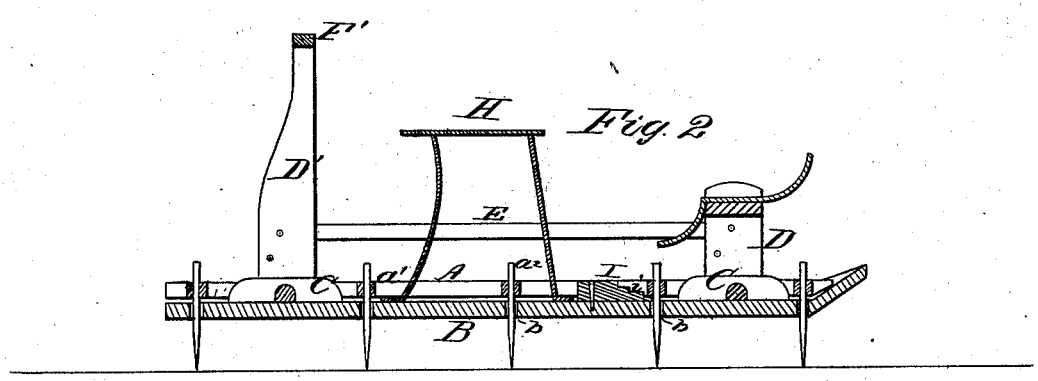

UNITED STATES PATENT OFFICE.

JAMES A. DAVIS, WILLIAM D. GUSEMAN, AND HORATIO D. McGEORGE, OF MORGANTOWN, WEST VIRGINIA.

IMPROVEMENT IN HARROWS.

Specification forming part of Letters Patent No. 203,248, dated May 7, 1878; application filed March 4, 1878.

*To all whom it may concern:*

Be it known that we, JAS. A. DAVIS, WILLIAM D. GUSEMAN, and HORATIO D. MCGEORGE, of Morgantown, in the county of Monongalia and State of West Virginia, have invented certain new and useful Improvements in Harrows; and we do hereby declare the following to be a full, clear, and exact description of the invention, such as will enable others skilled in the art to which it pertains to make and use it, reference being had to the accompanying drawings, which form part of this specification, in which—

Figure 1 is a perspective view of our improved harrow. Fig. 2 is a vertical longitudinal section.

This invention has relation to that class of self-cleaning adjustable harrows in which the harrow-teeth attached to the bars of a skeleton frame pass through a perforated bed or bottom, and are cleaned by elevating the skeleton frame, so as to withdraw the points of the teeth toward or into the perforations, and cause them to leave their accumulations of soil below, the edges of the perforations serving as scrapers to relieve the teeth of their loads.

Our invention or improvements consist in the novel construction, combination, and arrangement of special mechanism whereby the tooth-frame may be easily and conveniently elevated and lowered by the feet of the operator seated upon the perforated bottom, or by the hand of a person walking behind the implement.

Our invention also consists in the provision of novel means for supporting the toothed frame at different heights, so that the depth of the teeth in the soil may be nicely regulated to suit requirements.

For the purposes of our invention the perforated bottom or runner has pivoted to four blocks on its upper surface four levers, which are connected by links to the harrow-frame, and are coupled in pairs at the sides by pivoted connecting-bars and at the ends by transverse bars, the latter being the mediums through which, by the movement to and fro of the levers, the harrow-frame is raised and lowered. To the forward one of the transverse bars is attached a suitable foot-plate, while the rear bar is a narrow rail, which may be easily handled.

The device for regulating the depth of the teeth is a block pivoted to the perforated bottom or runner, and rabbeted at the free end, as hereinafter specifically described and claimed.

Referring to the accompanying drawings, A designates the harrow-frame, of ordinary construction, consisting of side beams $a$, connected by transverse beams $a^1$, the latter being furnished with teeth $a^2$. B designates the runner or bottom, having its forward end curved upward, and having holes or perforations $b$ for the passage of the harrow-teeth. C C are blocks or cleats fastened to said bottom, and D D' are levers pivoted thereto, connected by links $d$ $d$ to the side beams of the harrow-frame, and in pairs at the sides together by means of pivoted bars E. F F' are transverse bars, connecting the forward and rearward levers together in pairs respectively. G is a plate attached to bar F, so that the levers may be tilted and harrow raised or lowered by the feet of the operator seated at H.

The bar F is adapted to be handled for a like purpose by a person walking, so that the harrow may be adjusted either by hand or foot.

I is a block or cleat pivoted to the runner in front of the driver's seat, so that it may be moved by his foot, and having its end suitably rabbeted or notched, as at $i$.

By moving this notched end under the crosspiece A' of the harrow-frame, after raising the latter, said frame may be supported at different heights, and the depth of the harrow-teeth regulated.

The object of the side bars E is to cause a perfect and even adjustment of the harrow-frame at all points by causing the levers to work together.

Having fully described our invention, what we claim as new, and desire to secure by Letters Patent, is—

1. The combination, with the perforated runner or base B and vertically-adjustable harrow-frame A, of the levers D D', pivoted, respectively, to the forward and rearward portions of said runner, cross-bars F F, the links $d\ d$ connecting said levers to the frame A, and the side bars E coupling the levers for conjoint operation, substantially as described.

2. The winged foot-plate G, in combination with the connecting-bar F, levers D D′, harrow-frame A, runner B, and links $d$, substantially as described, and for the purpose set forth.

In testimony that we claim the foregoing we have hereunto set out hands this 28th day of February, 1878.

JAMES A. DAVIS.
  WILLIAM D. GUSEMAN.
  HORATIO D. McGEORGE.

Witnesses:
 T. G. MEEKS,
 S. SEARS.